United States Patent [19]

Koberstein et al.

[11] 4,048,098

[45] Sept. 13, 1977

[54] CATALYST FOR PURIFICATION OF EXHAUST GASES AND PROCESSES FOR ITS PRODUCTION AND USE

[75] Inventors: Edgar Koberstein, Alzenau; Eduard Lakatos, Rhinefelden, Baden, both of Germany

[73] Assignee: Deutsche Gold- und Silber-Scheideanstalt vormals Roessler, Frankfurt am Main, Germany

[21] Appl. No.: 439,174

[22] Filed: Feb. 4, 1974

[30] Foreign Application Priority Data

Feb. 9, 1973 Germany .............................. 2306395

[51] Int. Cl.$^2$ ........................ B01J 21/00; B01J 21/04; B01J 21/08; B01J 21/12; B01J 23/64; B01J 23/74
[52] U.S. Cl. .................................. 252/432; 252/438; 252/443; 252/455 R; 252/458; 252/460; 252/462; 252/465; 252/466 B; 252/466 PT; 252/470; 252/471; 252/472; 423/213.5
[58] Field of Search ................... 252/466 R, 460, 465, 252/466 B, 470, 471, 472, 432, 438, 455 R, 458, 462, 443; 423/213.2, 213.5

[56] References Cited

U.S. PATENT DOCUMENTS

| 3,257,163 | 6/1966 | Stiles ................................ 423/213.2 |
|---|---|---|
| 3,458,276 | 7/1969 | Bloch ............................... 423/213.5 |
| 3,493,325 | 2/1970 | Roth ................................ 252/465 X |
| 3,656,915 | 4/1972 | Tourtellotte ..................... 423/213.2 |
| 3,699,683 | 10/1972 | Tourtellotte et al. ............. 423/213.5 |
| 3,702,236 | 11/1972 | Fessler ............................. 423/213.5 |
| 3,751,497 | 8/1973 | Schwerdtel et al. ........... 252/466 PT |
| 3,784,675 | 1/1974 | Kobylinski et al. ............. 423/213.5 |
| 3,819,536 | 6/1974 | DallaBetta et al. ............ 252/466 PT |
| 3,840,471 | 10/1974 | Acres ............................... 252/470 X |
| 3,852,215 | 12/1974 | Duhaut et al. ................. 252/466 PT |
| 3,963,827 | 6/1976 | Acres et al. ..................... 423/239 |

*Primary Examiner*—W. J. Shine
*Attorney, Agent, or Firm*—Beveridge, De Grandi

[57] ABSTRACT

A carrier catalyst comprises as the catalytically active component an intermetallic system of at least three metals, wherein at least one of said three metals is selected from the group consisting of (a) ruthenium, rhodium, palladium and platinum, and wherein at least one of said three metals is a base metal selected from the group consisting of (b) aluminum, titanium, chromium, manganese, cobalt and nickel, and further wherein said group (a) metals and said group (b) metals are in an atomic ratio of about 1:4 to 1:1, provided that, when said system contains platinum, rhodium and at least one of said base metals, the atomic ratio is 1:4 to 1:2.4. The catalyst can also contain aluminum.

54 Claims, No Drawings

CATALYST FOR PURIFICATION OF EXHAUST GASES AND PROCESSES FOR ITS PRODUCTION AND USE

This invention relates to a carrier catalyst for the purification of exhaust gases containing harmful substances which are oxidizable and/or reducible. Such gases may emanate from internal combustion engines and industrial installations. The catalyst has low starting and conversion temperatures, high conversion performance and favorable aging characteristics. This invention also relates to a process for the production of the catalyst and a process for the use of the catalyst.

In the catalytic purification of exhaust gases containing nitric oxides, organic compounds and carbon monoxide, such as the gases emitted by gasoline engines, the problem is to oxidize the organic compounds and carbon monoxide and to reduce the nitric oxides to harmless nitrogen. Oxidation and reduction can be carried out, for example, in two catalyst beds connected in series.

The first bed is filled with a reduction catalyst, and is contacted by the exhaust gas without the addition of secondary air. In this first bed, the nitric oxides are reduced by means of oxidizable components contained in the exhaust gas.

Since the exhaust gas can contain considerably larger quantities of oxidizable components than are needed for reduction, an oxidation step must follow the reduction step. Thus, the exhaust gas from the first bed is introduced into a second catalyst bed connected in series with the first bed, and secondary air added.

Depending upon the operational conditions of an internal combustion engine, characterized by the ratio of air/fuel supply and the stoichiometric air/fuel demand $\lambda$ (i.e., lambda), residual oxygen is emitted in variable quantities in the exhaust gas. Therefore, there is desired for the reduction step a catalyst that will still reduce the nitric oxides even at over-stoichiometric proportions of oxygen in the exhaust gas. A catalyst meeting these conditions not only makes it possible to improve the catalytic effectiveness of a two bed system, but it opens up the possibility of using a one bed system instead of the two bed system. In a one bed system, oxidation and reduction can be carried out simultaneously in the same bed.

Carrier catalysts are well known in the art. These are catalysts comprising a catalytically active substance that has been applied to a body (e.g., the carrier) in the form of a thin layer. The body can be catalytically inert (e.g., mullite), or it can promote the catalytic effect of the substance (e.g., gamma - alumina). In purifying an automobile exhaust gas, the carriers can be in the form of spheres, extrudates, tablets, etc. (e.g., for use in pellet beds). The body can also have a monolithic construction comprising a number of unobstructed gas flow channels therethrough (e.g., for compact beds).

Carrier catalysts having an active component containing one or more platinum group metals are known in the art for the one or two bed systems. These catalysts can be obtained by saturating a porous carrier material, for example γ-aluminum oxide (i.e., gamma-aluminum oxide) with halide solutions of the platinum group metals, and subsequently reducing the halides, such as in a hydrogen stream.

Furthermore, carrier catalysts having an active component comprising a combination of platinum group metal and a base metal oxide are also known. These catalysts are obtained by impregnating a suitable carrier material with a platinum group metal halide, converting the halide to free metal, saturating the resulting mixture in a second step with a solution of base metal halide, followed by thermal decomposition in the presence of air.

The known catalysts hardly meet the requirements for catalytic purification of exhaust gases from motor vehicles and industrial plants containing numerous harmful substances of different oxidizability, especially gases from diesel and gasoline engines, because of the relatively high starting and operating temperatures of the catalysts, limited conversion performance of the catalysts and quick aging of the catalysts. Their function becomes particularly critical whenever they are used in the reduction stage of a two bed system under operating conditions in which $\lambda > 1$, i.e., overstoichiometric quantities of oxygen, or in a one bed system with the simultaneous oxidation of hydrocarbons and carbon monoxide and reduction of nitric oxides at $\lambda = 1$.

This invention aids in overcoming these shortcomings by providing a carrier catalyst, the superior characteristics of which result from the structure of a catalytically active impregnation achieved by a special production process.

The carrier catalyst of this invention is characterized by an intermetallic system which serves as the catalytically active component. The catalyst comprises at least three metals, at least one of which is a platinum-group metal selected from the group consisting of ruthenium, rhodium, palladium and platinum. Further, at least one of the three metals is a base metal selected from the group consisting of aluminum, titanium, chromium, manganese, cobalt and nickel. The atomic ratio of the platinum-group metals to the base metals is about 1:4 to 1:1. When the intermetallic system contains platinum, rhodium and at least one of said base metals, then the atomic ratio is 1:4 to 1:2.4. In any case, the quantity of base metal expressed in gram-atoms is not less than the gram-atoms of platinum-group metals.

The process of this invention comprises contacting a catalyst carrier with an aqueous solution comprising the halides, preferably the chlorides, of the desired platinum-group metals and base metal. The resulting impregnated carrier is then dried. Drying can be conducted at about 100°–300° C for about 3–0.5 hours, preferably about 150°–250° C for about 1.5–1 hours. The dried impregnated carrier is then heated at a temperature of about 450°–1000° C in a stream of hydrogen to chemically reduce the halides. Preferably, reduction is carried out at a temperature of about 500°–900° C, with a temperature of about 700°–850° C being particularly preferred. The heating operation for this reduction step is conducted for about 0.5–3 hours, preferably about 1–1.5 hours. Typically, the carrier material and aqueous solution are contacted for about 5–40 minutes, preferably about 10–25 minutes. This process for the production of the catalysts of this invention is considered to be essential if the desired catalyst characteristics are to be achieved.

This invention also provides a process for purifying an exhaust gas comprising contacting the exhaust gas with the catalyst of this invention at a temperature of about 150°–1000° C, preferably about 200°–800° C. Preferably, the exhaust gas is a vehicle or industrial plant exhaust gas. In a further preferred embodiment, the exhaust gas comprises at least one hydrocarbon, carbon monoxide, at least one nitrogen oxide or mixtures thereof. It is particularly preferred that at least one hydrocarbon, carbon monoxide, at least one nitrogen oxide or mixtures thereof be substantially removed from the exhaust gas by oxidation, reduction or both oxidation and reduction.

The carrier catalysts of this invention can also contain aluminum metal. These catalysts can be prepared by applying to a catalyst carrier an aqueous solution comprising the halides, preferably the chlorides, of the platinum-group metals and base metals other than aluminum. The resulting impregnated carrier is then dried, as previously described, and subsequently treated in a second step with an aqueous suspension of aluminum powder. After again drying the treated support as previously described, the halides are chemically reduced at an elevated temperature (e.g., about 450°–1000° C). in a stream of hydrogen. The use of aluminum powder in this manner instead of aluminum halide is advantageous because the aluminum remains in the upper portion of the carrier, whereas an aluminum halide solution penetrates the carrier to a much greater extent. As will be apparent from the Examples hereinafter, e.g., Example 16, the use of aluminum powder yields catalysts having lower starting temperatures, lower operating temperatures and improved life-times. Generally, the particle size of the aluminum powder is less than about 10 microns, preferably less than about 1 micron. Particle sizes of about 0.05–0.8 microns for the aluminum are particularly preferred.

The catalytically active impregnant contains at least as many gram-atoms of base metal as gram-atoms of noble metal; generally an excess of the base metal exists. The catalytically active impregnant at the same time always contains at least three metals, of which at least one is a noble metal and at least one a base metal. The catalytically active impregnant contains alloy-like compounds or mixtures, the favorable catalytic characteristics of which are explained by a structure conditional on preparation.

An essential feature of the process of this invention comprises dissolving all the metal halides, preferably chlorides, together in an aqueous impregnating solution. In this manner it is possible to achieve, after impregnation, a dry product comprising mixed crystals of the halides, which are the precursors of the intermetallic phases comprising the intermetallic system. These phases are to be considered at least the cause of the unexpectedly high and continuous effectiveness of the catalysts of this invention. The intermetallic system of the catalytically active component, which can also oxidic components depending upon the amount of oxygen present during operation of the catalyst in a converter system, develops by means of a chemical reduction stage in a hydrogen stream. This reduction takes place at elevated temperature. Other production processes do not yield a catalyst matrix exhibiting comparable effectiveness.

As the active component, the following metal combinations are particularly effective:
ruthenium, platinum, aluminum;
rhodium, platinum, aluminum, optionally with cobalt, chromium or manganese;
palladium, platinum, aluminum, optionally with cobalt, manganese or nickel;
rhodium, palladium, aluminum, platinum, optionally with nickel; as well as
palladium, titanium, manganese.

A catalysis promoting metal oxide, such as $\eta$ (i.e., eta) —and/or $\gamma$ (i.e., gamma) —$Al_2O_3$, $BeO$, $ZrO_2$, $MgO$, $SiO_2$, $TiO_2$ or silicates, such as barium, boron or aluminosilicates, silicon nitride, or titanates, such as barium or aluminum titanates, having a specific surface area of at least about 10 $m^2/g$, can be used as the catalyst carrier for the metal combination.

It is also possible to employ the catalysis promoting carrier material as a film on a shock resistant, slightly porous, predominantly crystalline, ceramic body. Preferably, the catalysis promoting carrier material is applied to the ceramic body by bringing the body into contact with an aqueous dispersion of the carrier material, such as by dipping the body into the dispersion. The dispersion can optionally contain a salt of the metal component of the catalysis promoting carrier material, or a hydroxide of the carrier material, or a hydrated oxide precursor of the carrier material. Excess amounts of the dispersion can be removed, such as by blowing, and the resulting treated body subsequently calcined. The support coated with the carrier material can then be contacted, such as by dipping, with the aqueous solution of the group (a) and group (b) metals, dried and calcined as previously described.

The carrier catalyst of this invention yields particularly good results, especially outstanding stability on aging, when there is employed as the catalysis promoting metal oxide $\gamma$-$Al_2O_3$ containing calcium, strontium or barium ions, and having a specific surface of at least about 100 $m^2/g$.

The ceramic body employed as a support should be slightly porous to enhance the adhesion of the catalysis promoting metal oxide, silicate or titanate. It has been found effective to employ a ceramic body having a surface area of at least about 0.3 $m^2/g$, a macropore volume, determined with a mercury porosimeter, of at least 20% and macropores of over 10,000 A.

Typical of the raw materials for the ceramic body are $\gamma$-$Al_2O_3$, mullite, zirconium, zirconium mullite, cordierite, barium titanate, porcelain, thorium oxide, steatite, magnesium oxide, gadolinium oxide, samarium oxide, boron carbide, silicium nitride, or silicon carbide in compact or fiber form.

An exhaust gas purifying installation having desirable flow characteristics, particularly low back pressure effects, can be obtained with a ceramic body consisting of a monolithic skeletal frame having numerous unobstructed gas channels passing through it. Such monoliths are known in the art. In the examples set forth hereinafter, commercially available monolithic support bodies are employed, which meet the above-mentioned criteria.

The embodiment directed to the production of a catalytically active component containing aluminum consists of applying the platinum-group metal and aluminum, and optionally another base metal, to the carrier in the indicated atomic ratios. The carrier is contacted in the second step with an aqueous suspension of aluminum powder. The impregnation is dried, at about 100°–300° C, and then heated in a hydrogen stream at temperatures of about 450°–1000° C, preferably about 500°–900° C, especially about 700°–850° C.

The method of applying the catalysis-promoting carrier material on the ceramic body is of essential importance for the durability of the active coating on a ceramic monolithic support. It has been found to be effective to apply the catalysis-promoting carrier material to the ceramic body by bringing the body into contact with an aqueous dispersion of the carrier material, removing excess quantities of the dispersion, and calcining at temperatures of about 450°–1000° C, preferably about 500°–900° C, especially about 700°–850° C. These process steps can optionally be carried out several times.

Catalysts, which are quite resistant to aging (e.g., they retain their catalytic activity over a relatively long period of time), can be obtained by contacting a ceramic body with an aqueous dispersion of γ-aluminum oxide, its hydroxide, or its hydrated oxide precursor, containing calcium, strontium or barium salt, preferably a nitrate salt. Typical of other salts are the chlorides, bromides, chlorates and acetates. It is particularly preferred to employ an aqueous dispersion containing in suspension about 0.5–0.5 mole/1 hydroxide or hydrated oxide, expressed as $Al_2O_3$, and about 0.0075–1.5 mole/l calcium, strontium or barium salt in solution.

It has been found that the adhesion of a catalysis-promoting layer of γ-aluminum oxide to a ceramic body can be increased by contacting the ceramic body with an aqueous dispersion of γ-aluminum oxide, or its hydroxide or hydrated oxide precursor, containing aluminum salt and calcium, strontium or barium salt, preferably a nitrate salt. Such a dispersion can comprise in suspension about 0.05–0.5 mole/l hydroxide or hydrated oxide precursor, expressed as $Al_2O_3$, and about 0.05–0.5 mole/l aluminum salt and about 0.01–0.2 mole/l calcium, strontium or barium salt in solution. The aluminum salts that can be employed are those which can be decomposed in the presence of air at the calcination temperatures (e.g., about 450°–1000° C) to form $Al_2O_3$.

Another preferred embodiment of this invention for the application of an aluminum oxide layer to a ceramic body includes the use of freshly precipitated aluminum hydroxide in the dispersion, aged 1–6 hours at room temperature while stirring vigorously, and/or an antisedimentation agent as an additive to the dispersion. Typical of such agents are methylcellulose, dextrin, tragacanth, starch, polyvinyl alcohol, polypropylene glycol, gum arabic, etc., or mixtures thereof. Aging favorably affects the aluminum hydroxide particle growth. The amount of the antisedimentation agent employed is dependent upon the viscosity of the dispersion after aging. Typically, the antisedimentation agent is employed in an amount sufficient to provide a dispersion having a viscosity of about 3–300, preferably about 5–100 centipoise. A viscosity of about 20–50 centipoise is particularly preferred. Viscosities are determined by measuring at room temperature (e.g., 70°–72° F).

Catalysts which are particularly resistant to aging will be obtained when the dispersed γ-aluminum oxide or its hydroxide or hydrated oxide precursor contain calcium, strontium or barium. Preferably the dispersed $Al_2O_3$ or its hydroxide or hydrated oxide precursor also contains about 0.5–5 percent by weight of alkaline earth metal oxide (e.g., Ca, Sr, Ba), related to $Al_2O_3$. The alkaline earth metal-containing hydroxide or hydrated oxide precursor is preferably prepared by coprecipitation from solutions containing alkaline earth metal and aluminum salts.

In the following examples, the invention will be further explained. All parts, proportions and percentages are by weight unless otherwise indicated. Comparisons will be made of the effects of conventional catalysts (Examples 7, 8) and catalysts of this invention (Examples 9 to 16) in order to show that the catalysts of this invention, which contain at least three metals in the active component, at least one of which is a platinum-group metal and at least one of which is a base metal, contain intermetallic compounds, which are to be considered the reason for the catalytic characteristics exhibited during operation. To show this, the catalysts are prepared as described in Examples 1 to 6 employing combinations of pairs of metals that seem particularly desirable because of their efficacy. These catalysts are then characterized by X-ray diffraction. (Two-metal catalysts can be analyzed easily by X-ray diffraction, whereas three-metal catalysts of the invention cannot be analyzed by structure analysis unequivocally. Thus, Examples 1 – 6 will demonstrate that the process of this invention produces intermetallic systems in two-metal catalysts which must also be present in three-metal catalysts).

From this it seems probable that the activity of the catalysts of Examples 9 to 16 can be attributed to the intermetallic systems formed during the process of preparation. An X-ray structure analysis of the catalysts of this invention does not permit an unequivocal identification of intermetallic phases because of the complexity of the interferences occurring when there are more than two metal components.

EXAMPLE 1

200 g of aluminum oxide pellets of 2 to 4 mm diameter, types SBS 250 of the firm Pechiney, are impregnated with 100 ml of an aqueous solution, which is made from 4.0 g of an aqueous $H_2PtCl_6$-solution (with a content 25 percent Pt) and 1.235 g aluminum chloride ($AlCl_3 \cdot 6H_2O$). The impregnated pellets are dried by heating at 120° C for 3 hours. The dried pellets are then reduced in a hydrogen stream (gas flow) 35 l/h.l catalyst at 650° C for 1 hour. The catalyst contains 0.5% platinum as a compound, with an atomic ratio of platinum to aluminum of 1:1. Hereinafter, this catalyst is designated as 1.

The following phase compositions are found by X-ray diffraction (Guinier — pictures with CuK $\alpha_1$-radiation): $Al_2Pt$ and Pt can be identified as the main components; Al also appears in a subordinate way. A large number of distinct and highly intense interferences additionally show that more intermetallic Pt-Al-phases have developed, which are not yet included in the ASTM card file.

EXAMPLE 2

200 g aluminum oxide pellets of 2 to 4 mm diameter, type SCS 79 of the firm Pechiney (bulk weight 0.7 kg/l), are impregnated with 105 ml of an aqueous $PdCl_2$ solution (having a content of 1 g Pd), and then dried at 120° C for 3 hours, in a circulating drying cabinet. The impregnated and dried pellets are subsequently impregnated with an aqueous suspension comprised of 760 mg. aluminum powder having a grain size < 1 μ and 105 ml water. The pellets are dried again, and subsequently reduced for 30 minutes at 700° C in a hydrogen stream (volume velocity 35 h$^{-1}$).

The catalyst contains 0.5% palladium as compounds, with an atomic ratio of palladium to aluminum of 1:3.

The catalyst is designated as 2 hereinafter.

The following phase compositions are found by X-ray diffraction. The main portions, occurring in comparable quantities, are: $Pd_2Al_3$, PdAl (high temperature phase) and PdAl (low temperature phase). Additionally, the diagram showed some foreign lines, which are not yet included in the ASTM card index.

EXAMPLE 3

200 g of the carrier material mentioned in Example 2 are impregnated with 105 ml of an aqueous solution which contains 5 g of a 20% $PdCl_2$ solution and 0.18 g $AlCl_3.6H_2O$. The impregnated pellets are dried for 3 hours at 120° C in a circulating drying cabinet, and then subjected to a reduction reaction at 700° C in a hydrogen stream (volume velocity 35 $h^{-1}$).

The catalyst contains 0.5% by weight Pd, with an atomic ratio Pd:Al of 1:0.1. The catalyst is referred to as 3.

The structure examination results in a slight influencing of the lattice constant of the Pd. A value of $a_o = 3.887 \pm 0.004$ A is found for the lattice constant, while a value of $a_o = 3.8898$ A is given for the lattice constant of pure Pd (ASTM card file No. 5-0681). It is known from the pertinent literature (Noble Metal Manual, Degussa, Frankfurt/Main, 1967), that up to a Pd:Al atomic ratio of 1:0.4 no radiographically determinable phases can develop.

EXAMPLE 4

A catalyst is produced according to the process of Example 2. The catalyst contains 0.5% by weight rhodium as a compound and an atomic ratio of rhodium to aluminum of 1:3. In preparing this catalyst there are employed an aqueous solution containing 2.64 g $RhCl_3.XH_2O$ with a Rh — content of 37.7% by weight and a suspension of 800 mg aluminum powder in successive applications with intermediate drying. The reduction step is conducted in a hydrogen stream at 500° C. after drying of the impregnated carrier. The catalyst is designated hereinafter as 4.

The X-ray structure-evaluation shows the existence of an isotopic, intermetallic compound of IrAl, obviously RhAl, hitherto not mentioned in the ASTM card index.

EXAMPLE 5

200 g aluminum oxide pellets of 2.4–4 mm diameter, type SBS 250 of the firm Pechiney, are impregnated with 100 ml of an aqueous solution containing the following ratios of platinum and cobalt salts:

Example: 5.1: 6.66 g $H_2PtCl_6$ solution (15% Pt) and 2.01 g $CoCl_2 . 4H_2O$

Example: 5.2: 6.66 g $H_2PtCl_6$— solution (15% Pt) and 4.02 g $CoCl_2 . 4H_2O$

Example: 5.3: 6.66 g $H_2PtCl_6$— solution (15% Pt) and 1.00 g $CoCl_2 . 4H_2O$

The impregnated pellet carriers are dried for 3 hours at 120° C, and then reduced in a hydrogen stream (volume velocity 35 $h^{-1}$) for 30 minutes at 500° C. The catalysts contain 0.5% by weight Pt, with the following atomic ratios of Pt to Co:

| Example | Ratio |
|---------|-------|
| 5.1: | 1:1.70 |
| 5.2: | 1:3.40 |
| 5.3: | 1:0.85 |

These catalysts are designated hereinafter as 5.1, 5.2 and 5.3, respectively.

The X-ray diffraction-pictures of samples 5.1, 5.2 and 5.3 show neither the diagram of Pt nor of Co. Sample 5.2 gives some weak and diffuse lines. In sample 5.1, the same lines are developed more distinctly. The radiographic picture of sample 5.3 shows an even clearer diagram. The PtCo-compounds are not included in the ASTM card index. The plane spacing (d-values) of the samples correspond about to those of the compound PtFe; the intensities, on the other hand, deviate considerably from the given value. Assuredly, a new, unknown isotopic intermetallic compound similar to FePt has developed from Pt and Co, obviously CoPt.

EXAMPLE 6

A catalyst 6.1 containing 0.5% by weight rhodium as compound, and having an atomic ratio of Rh to Co of 1:1.88, and catalyst 6.2 containing 0.5% by weight palladium as a compound with Co and having an atomic ratio Pd:Co of 1:1.80 are each prepared according to a method (impregnation from aqueous salt solutions) analogous to Example 5.

The radiographic examination of 6.1 shows the presence of a cubic compound having a lattice constant $a_o = 3.701 \pm 0.003$ A. The X-ray diagram of 6.2 shows a cubic compound having a lattice constant $a_o = 3.750 \pm 0.003$ A. It is suspected that there are mixed crystals in both cases. The ASTM card index gives the following lattice constants ($a_o$) for Rh, Pd and Co:

Rh = 3.8031 A
Pd = 3.8898 A
Co = 3.5447 A

Catalyst 6.1 is treated for 24 hours in an air stream at 650° C. As single phase, a compound isotopic with $LiGaRh_4O_8$ is found by X-ray structure analysis after this treatment. A corresponding compound of cobalt-rhodium is not known so far. On the basis of analogous conclusions, one can deduce that Co (I) Co (III) $Rh_4O_8$ is present in the case of oxidized catalyst 6.1.

EXAMPLE 7

(COMPARATIVE EXAMPLE)

300 g of a monolithic carrier body, type ALSIMAG 795 HSA (=high surface area), of the firm American Lava, are impregnated with 60 ml of an aqueous solution containing 3.6 g $H_2PtCl_6$ solution with a Pt content of 25% by weight and 3.0g $PdCl_2$ solution with a Pd content of 20%. The impregnated carrier body is dried at 120° C. in a circulating drying oven for 3 hours, and then reduction carried out at 500° C. for 30 minutes in a hydrogen stream (volume velocity 35 $h^{-1}$). The catalyst contains 0.5% by weight noble metal with an atomic ratio of Pt:Pd of 1:1.2. This catalyst is designated 7 hereinafter.

EXAMPLE 8

(COMPARATIVE EXAMPLE)

Analagous to Example 7, a Pt-Rh-Catalyst is produced. which contains 0.5% by weight noble metals and has an atomic ratio of Pt:Rh of 1:1. For this catalyst, $H_2PtCl_6$ solutions and $RhCl_3 .XH_2O$ solutions are employed.

The catalyst is designated 8.

EXAMPLE 9

Analogous to Example 7, a Pt-Pd-Al-catalyst is prepared, which contains 0.5% by weight noble metals, and has an atomic ratio of the active phase Pt:Pd:Al of 1:1.2:3.6. Impregnation is carried out with an aqueous solution which contains, per liter, 75.0 g $H_2PtCl_6$ solution (20% Pt), 50.1 g $PdCl_2$ solution (20% Pd) and 67.0 g $AlCl_3 . 6H_2O$. The catalyst is designated 9 hereinafter.

EXAMPLE 10

Analogous to Example 7, a Pt-Rh-Al catalyst is prepared which contains 0.5% by weight noble metals, and having an atomic ratio for the active phase Pt:Rh:Al of 1:1:6. Impregnation is carried out with an aqueous solution, which contains, per liter, 81.7 g $H_2PtCl_6$ solution with a Pt content of 20%, 22.6 g $RhCl_3 \cdot XH_2O$ with a Rh content of 37.7% and 122.0 g of $AlCl_3 \cdot 6H_2O$. The catalyst is designated 10.

EXAMPLE 11

Pt-Rh-Co-Al catalysts are prepared in Examples 11.1 to 11.4, which contain 0.5% by weight noble metals and whose atomic ratios for the active phases are as follows:

|      | Pt:   | Rh:   | Co:  | Al   |
|------|-------|-------|------|------|
| 11.1 | 1.05: | 1:00: | 1.17 | 4.00 |
| 11.2 | 1.05: | 1:00: | 1.75:| 4.00 |
| 11.3 | 1.05: | 1:00: | 3.50:| 4.00 |
| 11.4 | 1.05: | 1:00: | 5.25:| 4.00 |

Impregnation is accomplished with an aqueous solution containing 6.66 g $H_2PtCl_6$ solution having a Pt content of 15% by weight and 1.319 g $RhCl_3 \cdot XH_2O$ solution (37.84%) 4.726 g $AlCl_3 \cdot 6H_2O$ and in case of the catalysts

|      |                              |
|------|------------------------------|
| 11.1 | 1.35 g $CoCl_2 \cdot 6H_2O$  |
| 11.2 | 2.02 g $CoCl_2 \cdot 6H_2O$  |
| 11.3 | 4.04 g $CoCl_2 \cdot 6H_2O$  |
| 11.4 | 6.06 g $CoCl_2 \cdot 6H_2O$  |

EXAMPLE 12

The mixed catalysts summarized in Table 1 and keyed as to the combinations of elements, atomic ratios and contents of noble metals, are prepared in a manner analogous to Example 7. The noble metal and non-noble metal impregnation is conducted in aqueous solution of the corresponding chlorine compounds, for example $H_2PtCl_6$; $RhCl_3 \cdot XhO$; $AlCl_3 \cdot 6H_2O$; $NiCl_2 \cdot 6H_2O$; $MnCl_2 \cdot 4H_2O$; $TiCl_3$—solution (15%).

Table 1

| Catalyst No. | Combination of Elements | Atomic Ratio         | Content of Noble Metal (% by weight) |
|--------------|-------------------------|----------------------|--------------------------------------|
| 12.1.        | Pt/Ru/Al                | 1:1:3                | 0.5                                  |
| 12.2.        | Pd/Mn/Ti                | 1:1.3:0.73           | 0.5                                  |
| 12.3.        | Pt/Pd/Co/Al             | 1:1.22:2.2:3.6       | 0.5                                  |
| 12.4.        | Pt/Pd/Mn/Al             | 1:1.22:2.38:3.6      | 0.5                                  |
| 12.5.        | Pt/Pd/Rh/Al             | 1:0.61:0.63:4.8      | 0.5                                  |
| 12.6.        | Pt/Pd/Rh/Al             | 1:1.22:0.32:4.8      | 0.5                                  |
| 12.7.        | Pt/Pd/Ni/Al             | 1:0.91:1.55:3.6      | 0.5                                  |
| 12.8.        | Pt/Pd/Ni/Al             | 1:1.22:2.08:4.8      | 0.5                                  |
| 12.9.        | Pt/Rh/Cr/Al             | 1:0.94:1.86:2.86     | 0.5                                  |
| 12.10.       | Pt/Rh/Mn/Al             | 1:0.94:1.77:2.86     | 0.5                                  |
| 12.11.       | Pt/Pd/Rh/Ni/Al          | 1:0.61:0.63:1.03:4.8 | 0.5                                  |

EXAMPLE 13

1. Application of an activated aluminum oxide containing calcium ions.

The catalyst support:
a. W1 (firm Corning Glass)
b. Alsimag 795, stacked material (American Lava)
c. Torvex (firm DuPont)
d. Ceraport (firm Feldmuehle AG),
with dimensions of 25 mm diameter and 76 mm length (1 × 3 inch) are covered with an active intermediate layer, as described subsequently. The specifications of these commercial support bodies are known and are not enumerated herein.

For this, a solution containing 3.5 kg $Al(NO_3)_3 \cdot 9H_2O$ and 58 g $Ca(NO_3)_2 \cdot 4H_2O$ dissolved in 31.5 l water (solution 1) as well as 15 l of a 5% ammonia solution (solution 2), are prepared. The two solutions are mixed from separate supply tanks in a precipitation apparatus intended for this purpose at ambient temperature while stirring vigorously. The pH value in the precipitation chamber is held constant at 9.0 ± 0.1. The precipitation product flows continuously via an overflow into a collecting tank. After standing for about 2 hours, it is sucked off and the suspension is mixed homogeneously in 6 l $H_2O$, to which 30 g methyl cellulose and 3.5 kg Al $(NO_3)_3 \cdot 9H_2O$ and 58 g $Ca(NO_3)_2 \cdot 4H_2O$ had been added. After intensive stirring for about 3 hours, the suspension is ready for use. The solids content, related to $Al_2O_3$, amounts to about 22% by weight. The solids content was determined by evaporating the suspension, drying it, and then roasting it at 1100° C. until the weight was constant. The viscosity is 22 centipoise. Apparatus: Rotovisko; Shearing gradient 1100 sec$^{-1}$.

The above-described monolithic support bodies are immersed in the above-described suspension, blown out with compressed air to free the channels of excess suspension, dried at 120° C. and calcined at 500° C. for 2 hours. This immersion, cleaning and calcining can be repeated several times. The compound bodies thereby obtained have specific surface areas between 8 and 80 m$^2$/g, measured according to BET. The support bodies enumerated under (1), for example, have the following specific surfaces:

a. W1: 28 m$^2$/g
b. Alsimag: 76 m$^2$/g
c. Torvex: 14 m$^2$/g
d. Ceraport: 48 m$^2$/g The stated specific surfaces are by way of example, and can be varied on all of the aforementioned carriers within wide limits.

2. Activation

The water absorption of support bodies provided with temperature stabilized activated aluminum oxide containing calcium ions is determined. For example, the following values are found:

a. W1: 14.3%
b. Alsimag: 20.0%
c. Torvex: 13.5%
d. Ceraport: 14.0%

Corresponding to the water absorption, the following aqueous impregnating solutions are prepared:

for (a) W1
38.02 g $H_2PtCl_6$ (20% by weight Pt)
10.65 g $RhCl_3 \cdot XH_2O$ (37.7 % Rh)
56.74 g $AlCl_3 \cdot 6H_2O$
in 1000 ml solution for (b) Alsimag:
27.35 g $H_2PtCl_6$ (20% by weight Pt)
7.53 g $RhCl_3 \cdot XH_2O$ (37.7% Rh)
40.64 g $AlCl_3 \cdot 6H_2O$
in 1000 ml solution for (c) Torvex:
40.40 g $H\,PtCl_6$ (20% by weight Pt)
11.15 g $RhCl_3 \cdot XH_2O$ (37.7% Rh)
60.20 g $AlCl_3 \cdot 6H_2O$
in 1000 ml solution for (d) Ceraport:
  39.02 g H$_2$PtCl$_6$ (20% by weight Pt)
  10.95 g RhCl$_3$ . XH$_2$O (37.7% Rh)
  58.2 g AlCl$_3$ . 6H$_2$O
in 1000 ml solution.

The atomic ratio Pt:Rh:Al in each of these cases is 1:1:6.

The carrier supports coated with an activated aluminum oxide containing calcium, are immersed in the corresponding solutions, blown out with compressed air, dried at 200° C. and reduced for 30 minutes at 400° C. in a H$_2$ stream (volume velocity 35 h$^{-1}$). This activation process is carried out three times altogether, and the reduction takes place at a temperature of 500° C. after the third impregnation. The content of noble metal in the catalyst is 0.5% by weight. The catalysts are designated No.: 13- with the suffix "W 1", "ALSIMAG", "TORVEX" or "CERAPORT".

EXAMPLE 14

A support body of the firm Societé General des Produits Refractaires, type FIBRAL 80, having a 4 inch outside diameter and being 1.25 inch thick, is immersed in water, blown out, and after standing for 15 minutes, impregnated with the suspension described in Example 13, Section (2a). A solution containing 3.5 kg Al (NO$_3$)$_3$ . 9H$_2$O and 63 g Ba(NO$_3$)$_2$ dissolved in 31.5 l of water (solution 1) and 15 l of a 5% ammonia solution (solution 2) are prepared for the production of the above suspension.

Precipitation is conducted in a manner analogous to Example 13, Section (1). After sucking off, 15 g swelled methylcellulose in 1 liter of water are added to the filter cake.

The solids content, related to Al$_2$O$_3$, amounts to about 20% by weight. Activation of the catalyst takes place as described in Example 13, Section (2). The content of noble metal is 0.48% by weight. The catalyst is designated 14 hereinafter.

EXAMPLE 15

An oval W1 — support body having the dimensions 85 × 130. × 150 mm and a specific surface of 50.8 m$^2$/g, is coated with an activated aluminum oxide according to the procedure of Example 13, Section (1), and then provided with a Pt-Rh-Co-Al active component in a manner analogous to the process of Example 13, Section (2). The following impregnating solution is used:
  36.5 g H$_2$PtCl$_6$ (25% Pt)
  12.6 g RhCl$_3$ . XH$_2$O (38.3% Rh)
  18.4 g CoCl$_2$ . 6H$_2$O
  45.3 g AlCl$_3$ . 6H$_2$O
in 2000 ml solution.

This corresponds to an atomic ratio Pt:Rh:Co:Al of 1:1:1.65:4.00.

The body is activated three times, and has a content of noble metal of 0.3% by weight. The catalyst is designated 15 hereinafter.

EXAMPLE 16

An Alsimag 795 body, stacked material, of 4 inch diameter and 6 inch length is coated according to the procedure of Example 13, Section (1), with activated aluminum oxide having a specific surface of 47 m$^2$/g as measured according to BET. Corresponding to a water absorption of the body (14.3%), an aqueous solution containing 75 g H$_2$PtCl$_6$ solution (20% Pt) and 51 g PdCl$_2$ solution (20% Pd) in 1000 ml solution is prepared. The body is impregnated, then dried for 2 hours in a hot air stream at 200° C. The body is again impregnated with an aqueous suspension of 15.4 g aluminum powder, which has a grain size smaller than 1μ, in 1000 ml of water and is again dried in the hot air current. In both cases, excess impregnating solution is blown out of the channels of the support body prior to the drying step. The treated support is reduced for 30 minutes at 700° C in a hydrogen stream (volume velocity 35 h$^{-1}$). The content of noble metal after activation two times is 0.5% by weight. The atomic ratios of the active components are:
  Pt : Pd = 1:1.2
  Pt : Al = 1:3
  Pd : Al = 1:3
The catalyst is designated 16.

EXAMPLE 17

The types of catalysts described in Examples 7–16 are placed in a test apparatus for a determination of their catalytic effectiveness. The apparatus consists of a mixing and dosing zone for the preparation of a test gas mixture, a reaction tube in a tube furnace and an analyzing zone. The test gas mixture is prepared by drawing the gases from pressurized flasks in the indicated quantities via rotameters, and mixing the gases in a mixing chamber provided with packing. The mixed gas produced is then fed to the reaction zone, whereby the gas consumed is controlled by sampling by way of a by-pass line. The drop in pressure along the reactor can be measured with the aid of manometers. The temperatures of the furnace and of the reaction zone in the catalyst piles is measured with the aid of shell thermoelements introduced centrally into the reaction tubes, and is continuously registered on a recorder.

The emerging gas is conducted to a reaction gas distributor. An analysis for CO and O$_2$ is made gas chromatographically. The analysis for hydrocarbons is made with a flame ionization detector. The analysis for nitric oxides is carried out with the aid of a selective nitrogen detecting electrode. The following gas mixture is used to test the catalysts:
  1.5 vol. % H$_2$,
  3.0 vol % CO,
  0.2 vol. % NO,
  0.05 vol. % C$_3$H$_6$,
  1.75 — 3.2 vol. % O$_2$, and
  the balance N$_2$.

The space velocity (GHSV — Gas hourly space velocity) is 40,000 Nl/hr . liter catalyst. The catalyst temperature is 700° C. The results achieved with catalyst 13-W1 are set forth in Table 2. For a better view an oxidation number is employed, and is defined as the quotient of vol. % O$_2$ in the exhaust gas divided by vol. % O$_2$ required for complete combustion of combustible components present in the test gas mixture. A quotient equal to 1 indicates stoichiometric quantities. A number less than 1 indicates less than stoichiometric quantities. A number greater than 1 indicates hyper-stoichiometric quantities of oxygen in the reaction gas.

The definition of such an oxidation number has advantages insofar as it facilitates comparison with the customary engine-related air-fuel ratio, or comparison with the lambda value (quotient of the actual to the stoichiometric intake air-fuel ratio) customary in the automobile industry, since the oxidation number is independent of whether oxygen enters the system via the exhaust gas of the engine or via a secondary pneumatic pump. Table 2 shows that an oxidation number of 1.1 is critical in regard to catalytic effect. At this value, the maximum degree of conversion of CO and hydrocarbons will be achieved. A high conversion rate of NO indicates that the catalyst can reduce nitric oxides even with a slight excess of oxygen.

An examination of the performance of the catalysts at an oxidation number of 1.1 will, therefore, permit a definite conclusion as to whether a catalyst is more suitable as an oxidation catalyst (Task: achievement of high conversion of high conversion rates during oxidation of hydrocarbons and carbon monoxide) or as an oxidation reduction catalyst. (Task: achievement each time of high conversion rates during the oxidation of hydrocarbons and carbon monoxide and of the simultaneously occurring reduction of nitric oxides). Therefore, the catalysts of this invention, as well as known catalysts, were tested with the criterion of the oxidation number =1.1 (cf. Table 3).

The $C_3H_6$ starting temperature is a further important parameter for evaluating catalysts, and one which is used in the motor vehicle industry and in industrial plants where the purification of the harmful components, carbon monoxide, hydrocarbons and nitric oxides, is important. In the case of the present catalysts, the starting temperature is designated as that at which a clear conversion, at least 10%, is measured for propylene ($C_3H_6$) present in the waste gas. It is generally about 100° C higher than the starting temperature for carbon monoxide, and higher than that for the $NO_x$ reduction reaction, and thus it is most critical for the entire system. The $C_3H_6$ starting temperatures are likewise included in Table 3.

Table 2

Catalyst Activity as Function of the Oxidation Number
Catalyst Sample 13 - W1
Reaction Temperature 700° C, GHSV = 40,000 h$^{-1}$

| Oxidation Number | Catalytic Conversion | | |
|---|---|---|---|
| | CO (%) | $C_3H_6$ (%) | NO (%) |
| 0.7 | 60 | 82 | 100 |

Table 2-continued

Catalyst Activity as Function of the Oxidation Number
Catalyst Sample 13 - W1
Reaction Temperature 700° C, GHSV = 40,000 h$^{-1}$

| Oxidation Number | Catalytic Conversion | | |
|---|---|---|---|
| | CO (%) | $C_3H_6$ (%) | NO (%) |
| 0.8 | 72 | 83 | 100 |
| 0.9 | 85 | 94 | 100 |
| 1.0 | 96 | 97 | 100 |
| 1.1 | 100 | 98 | 80 |
| 1.2 | 100 | 98 | 75 |
| 1.3 | 100 | 100 | 64 |

Table 3

Catalytic Effectiveness and $C_3H_6$ Starting Temperature of Catalysts at an Oxidation Number 1.1
Reaction Temperature 480° C, GHSV = 40,000 h$^{-1}$

| Catalyst Sample | | $C_3H_6$ Starting Temperature (° C) | Catalytic Conversion Rates | | |
|---|---|---|---|---|---|
| | | | CO(%) | $C_3H_6$(%) | NO(%) |
| 7 | (Comparative Example) | 280 | 98.0 | 92.8 | 6 |
| 8 | (Comparative Example) | 205 | 97.3 | 91.6 | 15.7 |
| 9 | | 230 | 100 | 99.6 | 8 |
| 10 | | 175 | 100 | 99.9 | 61.1 |
| 11.1 | | 200 | 100 | 98.7 | 46.5 |
| 11.2 | | 175 | 100 | 99.6 | 60.0 |
| 11.3 | | 215 | 100 | 99.1 | 52.3 |
| 11.4 | | 220 | 100 | 97.9 | 46.0 |
| 12.1 | | 180 | 100 | 99.2 | 43.2 |
| .2 | | 250 | 98.9 | 98.3 | 34.9 |
| .3 | | 260 | 100 | 98.8 | 17.0 |
| .4 | | 265 | 100 | 99.2 | 10.7 |
| .5 | | 205 | 100 | 99.5 | 28.8 |
| .6 | | 210 | 100 | 99.6 | 14.0 |
| .7 | | 235 | 100 | 98.3 | 13.0 |
| .8 | | 230 | 100 | 99.1 | 14.7 |
| .9 | | 190 | 100 | 99.8 | 49.5 |
| .10 | | 200 | 100 | 99.8 | 34.3 |
| .11 | | 180 | 100 | 98.3 | 40.7 |
| 13. | - W1 | 175 | 100 | 98.0 | 80.0 |
| 13. | - Alsimag | 155 | 100 | 98.8 | 90.3 |
| 13. | - Torvex | 180 | 100 | 97 | 75.0 |
| 13. | - Ceraport | 170 | 100 | 98.3 | 81.2 |
| 14 | | 210 | 100 | 97.9 | 48.3 |
| 15 | | 165 | 100 | 99.6 | 62.1 |
| 16 | | 190 | 100 | 99.9 | 19.3 |

A comparison of catalyst 7 of the prior art containing Pt/Pd with the catalysts of this invention containing palladium will clearly show that the latter have lower starting temperatures and considerably improved oxidative characteristics, and in some cases (Examples 12.5, 12.6, 12.11) additionally good reduction action.

A comparison of the known Pt/Rh-containing catalyst 8 and the catalysts of this invention containing rhodium clearly demonstrates improvement with regard to starting temperature and catalytic conversion, especially for NO-reduction.

As example 12.1 shows, noble metals other than palladium or rhodium too can be employed advantageously in the base/metal/noble metal combinations according to this invention.

EXAMPLE 18

Catalyst samples 13-W1 and 13-Alsimag of Example 13 are aged for 24 hours at an 800° C. gas temperature in an exhaust gas stream from a motor (3000 rev. min: lambda = 1.1), with and without addition of calcium, with otherwise the same composition and the same characteristics as well as the same mode of production. The catalytic conversion rates prior to and after ageing are measured according to Example 17 at an oxidation number of 1.1. The values obtained are set forth in Table 4.

Table 4
Influence of Calcium Stabilization on the Catalytic Characteristics After Aging
Reaction Temperature: 350° C
GHSV: 40,000 h$^{-1}$

| Catalyst Sample | Starting Temp. (°C) (for C$_3$H$_6$) | Catalytic Conversion Rates | | |
|---|---|---|---|---|
| | | CO(%) | C$_3$H$_6$(%) | NO(%) |
| 13-Wl Fresh | 175 | 100 | 88 | 68 |
| 13-Wl Aged | 257 | 100 | 63 | 48 |
| 13-Wl Fresh and Without Ca | 170 | 100 | 87 | 69 |
| 13-Wl Aged and Without Ca | 275 | 92 | 28 | 43 |
| 13-ALSIMAG Fresh | 155 | 100 | 93 | 77 |
| 13-ALSIMAG Aged | 230 | 100 | 93 | 77 |
| 13-ALSIMAG Fresh and without Ca | 160 | 100 | 91 | 80 |
| 13-ALSIMAG Aged and without Ca | 285 | 100 | 39 | 50 |

Even after aging catalysts of this invention containing catalysis promoting metal oxide and alkaline earth metal ions, the C$_3$H$_6$ starting temperatures and C$_3$H$_6$ conversion rates are still very satisfactory.

EXAMPLE 19

Catalysts are tested to determine their resistance to thermal shock. The test is as follows.

On a 1.9 liter vertical engine with electric gasoline injection, two monolith catalysts are alternatingly heated and cooled. The heating is accomplished with exhaust gas from the engine. Compressed air is blown in for the cooling process. The heating pattern on each catalyst is represented as follows:

Heating: 150° C to 750° C: 2 min. warm-up maximum heating speed: 2.225° C/min. constant driving conditions: 750° C: 14 min.

Cooling: 750° to 150° C: 14 min. maximum cooling speed: 455° C/min.

Duration of the test cycle: 30 min.

The cycle is run through 200 times, corresponding to a total testing time per monolith of 50 hours.

For checking of their activity, the catalysts are subjected to a functional test on the engine. For this purpose the conversions for CO, HC and NO$_x$ are measured at λ-value, changed every hour in the area of λ = 0.95 to 1.01, and 3000 rpm at a motor load of 27 kW. The gas hourly space velocity amounts to 75,000 h$^{-1}$ (NTP). For values of λ greater than 1, the average conversions of CO and hydrocarbons are calculated. For values of λ less than 1, the average conversion of NO$_x$ is calculated. The conversions with various fresh and aged catalyst types, which were produced according to the previously mentioned Examples 7 to 16, are as follows:

TABLE 5

| Catalyst - Sample Example No. | Activity Fresh-Conversion (%) | | | Activity Aged-Conversion (%) | | |
|---|---|---|---|---|---|---|
| | CO | HC* | NO$_x$ | CO | HC* | NO$_x$ |
| 7 (Comparative Example) | 92.0 | 79.3 | 45.3 | 85.0 | 72.1 | 20.4 |
| 8 (Comparative Example) | 93.4 | 81.2 | 70.4 | 84.7 | 73.2 | 55.0 |
| 9 | 94.1 | 83.6 | 50.2 | 92.1 | 82.4 | 45.1 |
| 10 | 98.2 | 89.7 | 83.1 | 92.0 | 86.7 | 81.2 |
| 11.3 | 94.1 | 90.0 | 78.1 | 93.2 | 86.4 | 71.9 |
| 12.1 | 96.3 | 88.4 | 80.7 | 92.6 | 84.4 | 77.3 |
| 12.2 | 92.3 | 81.4 | 60.9 | 90.0 | 77.3 | 58.3 |
| 12.8 | 98.3 | 86.6 | 65.3 | 96.4 | 82.3 | 60.0 |
| 12.9 | 96.4 | 87.8 | 81.3 | 93.2 | 84.2 | 8.0 |

*HC refers to hydrocarbons.

It is apparent from Table 5 that the catalyst samples of Examples 7 and 8 clearly lose their activity on ageing more quickly than the catalysts of this invention when each is subjected to the previously described thermal shock test.

EXAMPLE 20

Catalyst 13. Wl is connected in a suitable exhaust muffler to the exhaust pipe of a serial motor vehicle with regulated fuel injection, and tested in a road test according to the regulations set forth in the Federal Register, Volume 37, No. 221 (Nov. 15, 1972). The results are summarized in subsequent Table 6.

TABLE 6

| Road Test (miles) | HC* (g/mi) | CO (g/mi) | NO$_x$ (g/mi) |
|---|---|---|---|
| 0 | 0.16 | 2.25 | 0.15 |
| 4000 | 0.22 | 2.56 | 0.30 |
| 8000 | 0.27 | 2.72 | 0.35 |
| 12000 | 0.25 | 3.19 | 0.25 |
| 16000 | 0.35 | 2.10 | 0.33 |
| 20000 | 0.31 | 3.20 | 0.38 |
| 24000 | 0.30 | 3.00 | 0.40 |
| 28000 | 0.32 | 3.12 | 0.39 |

*HC refers to hydrocarbons.

It is apparent from Table 6 that the 1976 emission standards in the U.S. (HC=0.40, CO=3.50, NO$_x$=0.41 g/mi). over 25,000 miles are fulfilled with the aid of the catalyst of this invention. Up to this time, it is not believed that this is feasible with any other system.

The catalysts of this invention are advantageous for several reasons. First of all, they are very effective in converting hydrocarbons, nitrogen oxides and carbon monoxide into substances that are less harmful to humans. Secondly, they retain their desirable catalytic activity even upon ageing as demonstrated in the foregoing examples. Thus, they have good life times. Thirdly, they can function as both oxidation and reduction catalysts, making the use of one bed systems possible. Fourthly, the catalysts of this invention have relatively low starting and operating temperatures. Fifth, catalysts of this invention are capable of retaining their effectiveness even when subjected to thermal cycling (i.e. alternate heating and cooling). They are effective as oxidation or reduction catalysts at lambda values of 1, less than 1 or greater than 1. The catalysts also exhibit sufficient strength and resistance to mechanical shock to make them suitable for use in automotive applications. In fact, as demonstrated in Example 20, the catalyst is effective in road tests covering over 25,000 miles. Finally, quite surprisingly, the catalysts of this invention are effective in converting (NO)$_x$ compounds at lambda values of 1.1 (O$_2$ excess).

What is claimed is:

1. A carrier catalyst comprising an intermetallic system of at least three metals as catalytically active component, said catalyst comprising the product obtained by contacting a catalyst carrier with an aqueous solution comprising a halide of at least one metal selected from the group consisting of (a) rhodium, palladium and platinum, and a halide of at least one base metal selected from the group consisting of (b) aluminum, titanium, chromium, manganese, cobalt and nickel; drying the resulting impregnated carrier; and reducing the halides at a temperature of about 450°–1000° C in a stream of hydrogen; wherein said group (a) metals and said group (b) metals are in an atomic ratio of group (a) metals to group (b) metals of about 1 : 4 to 1 : 1; provided that, when said system contains platinum, rhodium and at least one of said base metals, said atomic ratio is 1 : 4 to 1 : 2.4.

2. Catalyst according to claim 1 in which at least one of said halides is a chloride.

3. Catalyst according to claim 1 in which said active component is prepared by treating a catalyst carrier with an aqueous impregnating solution containing halides of said metals other than an aluminum halide, drying the resulting impregnated carrier, treating the dried carrier with an aqueous suspension of aluminum powder, drying the treated carrier, and reducing the halides in a stream of hydrogen.

4. Catalyst according to claim 1 in which the active component comprises rhodium, platinum and aluminum.

5. Catalyst according to claim 1 in which the carrier is a catalysis promoting oxide.

6. Catalyst according to claim 5 in which the catalysis promoting carrier is a film on a shock resistant, slightly porous, predominantly crystalline ceramic support.

7. Catalyst according to claim 6 in which the catalysis promoting carrier is applied to the ceramic support by contacting the support with an aqueous dispersion of the carrier, of a hydroxide of the carrier, or of a hydrated oxide precursor of the carrier, and subsequently calcining the resulting structure.

8. Catalyst according to claim 7 in which the dispersion contains a salt of the metal component of the catalysis promoting carrier material.

9. Catalyst according to claim 1 in which the carrier is a catalysis promoting metal oxide comprising gamma-$Al_2O_3$ having a specific surface of at least about 100 $m^2/g$, and containing calcium, strontium or barium ions.

10. Catalyst according to claim 7 in which the ceramic support has a surface area of at least about 0.3 $m^2/g$, a macropore volume as determined by mercury porosimetry of at least about 20%, and macropores of at least about 10,000 A.

11. Catalyst according to claim 7 in which the ceramic support is contacted with an aqueous dispersion of gamma-aluminum oxide, its hydroxide or hydrated oxide precursor, said dispersion containing calcium nitrate, strontium nitrate or barium nitrate.

12. Catalyst according to claim 11 in which the dispersion contains about 0.05–0.5 mole/l of the hydroxide, or its hydrated oxide precursor, expressed as $Al_2O_3$, in suspension, and about 0.0075–1.5 of the calcium, strontium or barium salt in solution.

13. Catalyst according to claim 12 in which the ceramic support is contacted with an aqueous dispersion of gamma-aluminum oxide, its hydroxide or hydrated oxide precursor, said dispersion containing an aluminum salt and calcium nitrate, strontium nitrate or barium nitrate.

14. Catalyst according to claim 13 in which the dispersion comprises about 0.05–0.5 mole/l aluminum hydroxide or a hydrated oxide precursor, expressed as $Al_2O_3$, in suspension, and about 0.05–0.5 mole/l of the aluminum salt, and about 0.01–0.2 mole/l of the calcium, strontium or barium nitrate in solution.

15. Catalyst according to claim 14 in which the aluminum hydroxide is one which has been freshly precipitated and then aged for 1 to 6 hours at ambient temperature with intensive stirring.

16. Catalyst according to claim 13 in which the gamma-$Al_2O_3$, its hydroxide or hydrated oxide precursor contains about 0.5–5% by weight alkaline earth metal oxide based on the $Al_2O_3$.

17. Catalyst according to claim 1 in which said reduction is conducted for about 0.5 to about 3 hours and heating at about 100°–300° C for about 0.5 to about 3 hours to dry said resulting impregnated carrier.

18. Catalyst according to claim 17 in which said heating is conducted at about 150°–250° C for about 1 to about 1.5 hours.

19. Catalyst according to claim 1 in which said carrier material and said aqueous solution are contacted for about 5 to about 40 minutes.

20. Catalyst according to claim 4 in which said active component also contains cobalt, chromium or manganese.

21. Catalyst according to claim 1 in which the active component comprises palladium, platinum and aluminum.

22. Catalyst according to claim 21 in which the active component also contains cobalt, manganese or nickel.

23. Catalyst according to claim 1 in which the active component comprises rhodium, palladium, platinum and aluminum.

24. Catalyst according to claim 23 in which the active component also contains nickel.

25. Catalyst according to claim 1 in which the active component comprises palladium, titanium and manganese.

26. Catalyst according to claim 1 in which the carrier is selected from the group consisting of eta- or gamma-$Al_2O_3$, BeO, $ZrO_2$, MgO, $SiO_2$, barium silicate, boron silicate, silicon nitride, an aluminosilicate, barium titanate, and mixtures of any of these materials, said carrier having a specific surface of at least about 10 $m^2/g$.

27. Catalyst according to claim 26 in which the carrier is selected from the group consisting of eta- or gramma-$Al_2O_3$, and mixtures of these materials, said carrier having a specific surface of at least about 10 $m^2/g$.

28. Catalyst according to claim 10 in which the ceramic support is comprised of $\alpha$-$Al_2O_3$, mullite, zirconium, zirconium mullite, cordierite, barium titanate, porcelain, thorium oxide, steatite, magnesium oxide, samarium oxide, gadolinium oxide, boron carbide, silicon nitride or silicon carbide.

29. Catalyst according to claim 28 in which the ceramic support is in a compact or fiber form.

30. Catalyst according to claim 28 in which the ceramic support is comprised of a monolithic skeletal cordierite frame having multiple unobstructed channels passing therethrough.

31. Process for the preparation of a catalyst according to claim 1 said process comprising contacting the catalyst carrier with an aqueous solution comprising halides of the group (a) metals and group (b) metals in said atomic ratio, drying the resulting impregnated carrier, and reducing the halides at a temperature of about 450°–1000° C in a stream of hydrogen.

32. Process for the preparation of a catalyst according to claim 1 said process comprising contacting the catalyst carrier with an aqueous solution comprising the halides of the group (a) metals and group (b) metals other than aluminum, drying the resulting impregnated carrier, treating the dried carrier with the aqueous suspension of the aluminum powder, drying the carrier, and reducing the halides at a temperature of about 450°–1000° C in a stream of hydrogen.

33. Process according to claim 31 in which the catalyst carrier is applied to a ceramic support by contacting the support with an aqueous dispersion of the carrier, removing excess quantities of the dispersion, drying the treated support and calcining the treated support at a temperature about 450°–1000° C.

34. Process according to claim 33 in which the operating steps are repeated several times.

35. Process according to claim 33 in which the ceramic support is contacted with an aqueous dispersion of gamma-aluminum oxide, its hydroxide or hydrated oxide precursor, said dispersion containing calcium nitrate, strontium nitrate, or barium nitrate.

36. Process according to claim 35 in which the dispersion contains about 0.05–0.5 mole/l of the hydroxide, or its hydrated oxide precursor, expressed as $Al_2O_3$, in suspension, and about 0.0075–1.5 mole/l of the calcium, strontium, or barium salt in solution.

37. Process according to claim 33 in which the ceramic support is contacted with an aqueous dispersion of gamma-aluminum oxide, its hydroxide or hydrated oxide precursor, said dispersion containing an aluminum salt and calcium nitrate, strontium nitrate or barium nitrate.

38. Process according to claim 37 in which the dispersion comprises about 0.05–0.5 mole/l aluminum hydroxide or a hydrated oxide precursor, expressed as $Al_2O_3$, in suspension, and about 0.05–0.5 mole/l of the aluminum salt, and about 0.01–0.2 mole/l of the calcium, strontium or barium nitrate in solution.

39. Process according to claim 38 in which the aluminum hydroxide is one which has been freshly precipitated and then aged for 1–6 hours at ambient temperature with intensive stirring.

40. Process according to claim 37 in which the gamma-$Al_2O_3$, its hydroxide or hydrated oxide precursor contains about 0.5–5% by weight alkaline earth metal oxide based on the $Al_2O_3$.

41. Process according to claim 40 in which the alkaline earth metal-containing hydroxide or hydrated oxide precursor is prepared by coprecipitation from an alkaline earth metal- and aluminum salt-containing solution.

42. Process according to claim 35 in which the dispersion contains an anti-sedimentation agent.

43. Process according to claim 42 in which the antisedimentation agent is methyl cellulose, dextrin, tragacanth or starch, polyvinyl alcohol, polypropylene glycol, gum arabic, or mixtures thereof.

44. Process according to claim 31 in which said reduction is conducted for about 0.5–3 hours and heating at about 100°–300° C for about 0.5–3 hours to dry said resulting impregnated carrier.

45. Process according to claim 44 in which said reduction is conducted at about 500°–900° C for about 1–1.5 hours.

46. Process according to claim 44 in which said reduction is conducted at about 700°–850° C.

47. Process according to claim 44 in which said heating is conducted at about 150°–250° C for about 1–1.5 hours.

48. Process according to claim 31 in which said carrier material and said aqueous solution are contacted for about 5–40 minutes.

49. Process according to claim 31 in which said aqueous solution and said carrier material are contacted for about 10–25 minutes.

50. Process according to claim 42 in which said dispersion has a viscosity of about 3–300 centipoise.

51. Process according to claim 50 in which said dispersion has a viscosity of about 5–100 centipoise.

52. Process according to claim 43 in which said dispersion has a viscosity of about 20–50 centipoise.

53. Process according to claim 31 wherein said three metals are rhodium, platinum and aluminum and said atomic ratio is 1 : 4 to 1 : 2.4.

54. A process for the preparation of a carrier catalyst comprising an intermetallic system of at least three metals as catalytically active component, said process comprising:

1. contacting a catalyst carrier with an aqueous solution comprising a halide of at least one metal selected from the group consisting of (a) rhodium, palladium and platinum, and a halide of at least one base metal selected from the group consisting of (b) aluminum, titanium, chromium, manganese, cobalt and nickel;
2. drying the resulting impregnated carrier; and
3. reducing the halides at a temperature of about 450°–1000° C in a stream of hydrogen; wherein said group (a) metals and said group (b) metals are in an atomic ratio of group (a) metals to group (b) metals of about 1 : 4 to 1 : 1; provided that, when said system contains platinum, rhodium and at least one of said base meals, said atomic ratio is 1 : 4 to 1 : 2.4

* * * * *